April 20, 1954
H. B. ABER ET AL
2,675,809
COMBINE HAVING AUTOMATIC LEVELING AND
COUNTERBALANCING MEANS FOR SIEVES
Filed May 4, 1949
6 Sheets-Sheet 1
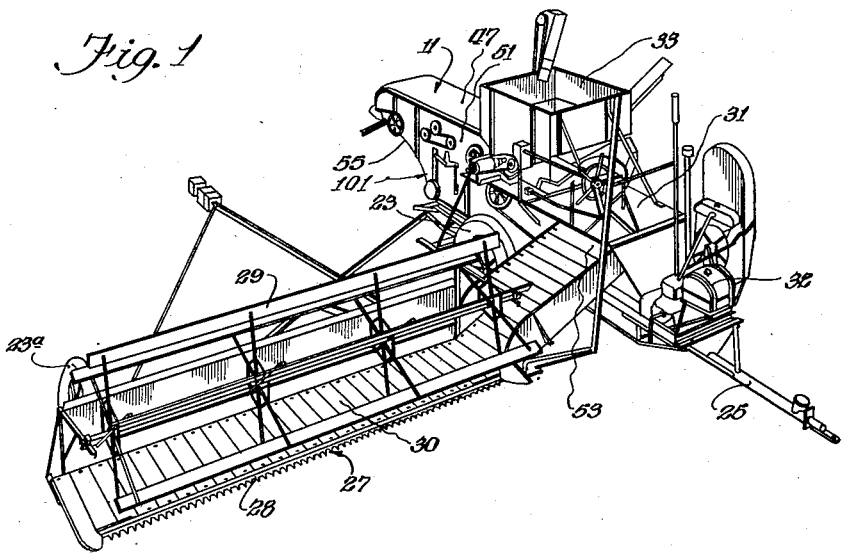
Fig. 1
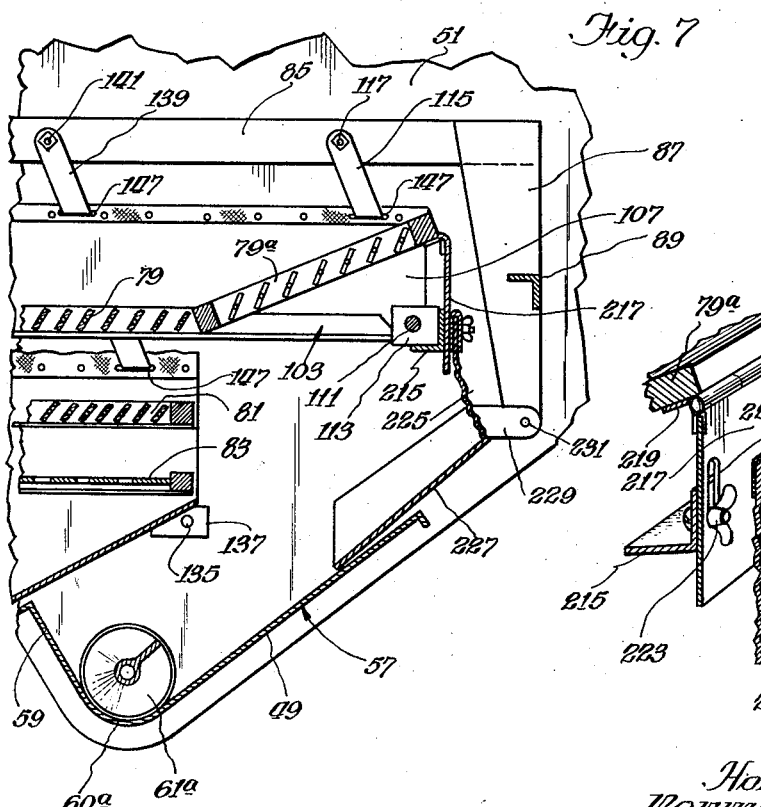
Fig. 7
Fig. 8
Inventors:
Homer B. Aber
Norman R. Krause
By: Soans, Pond & Anderson
Attys.

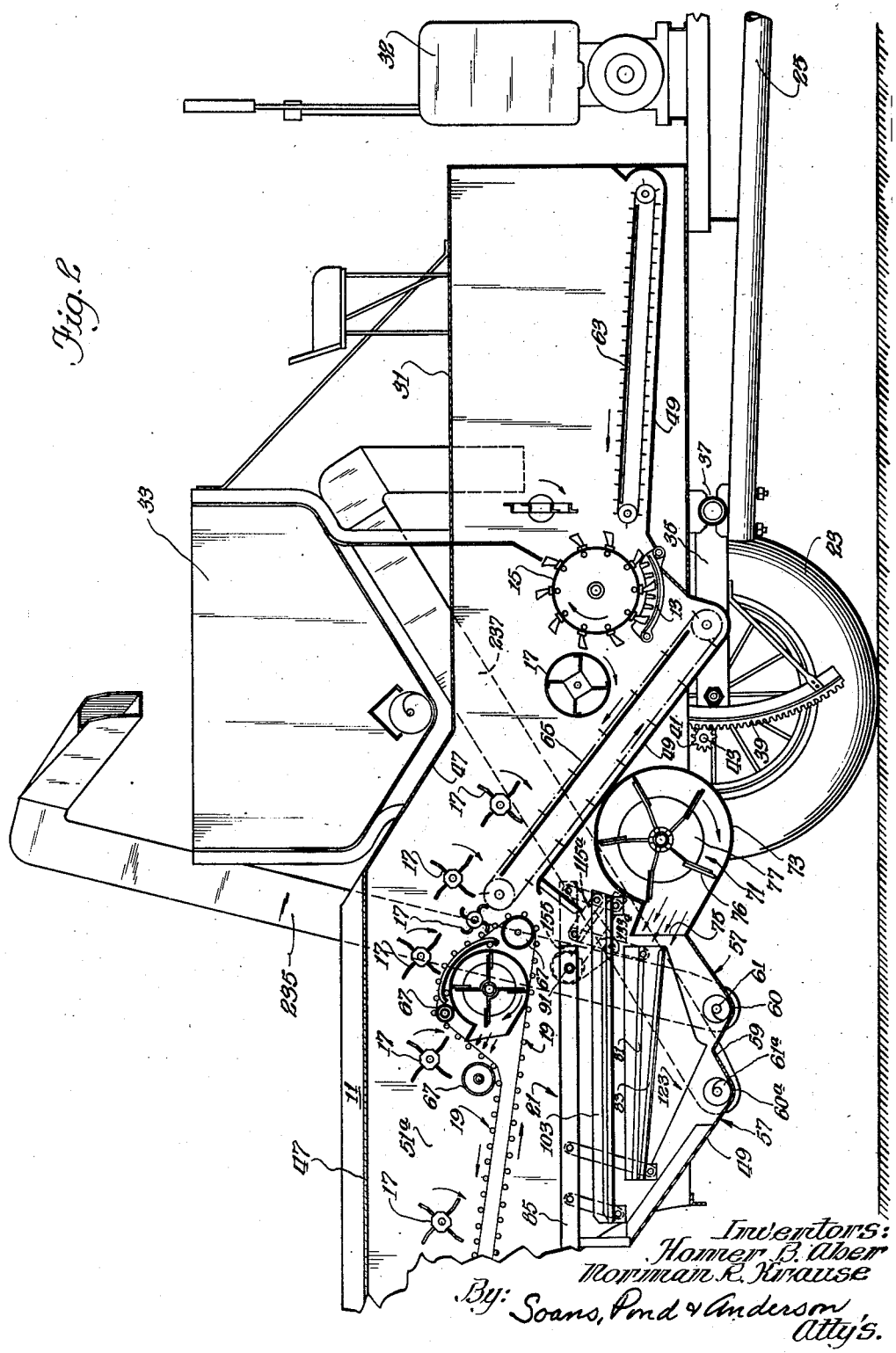

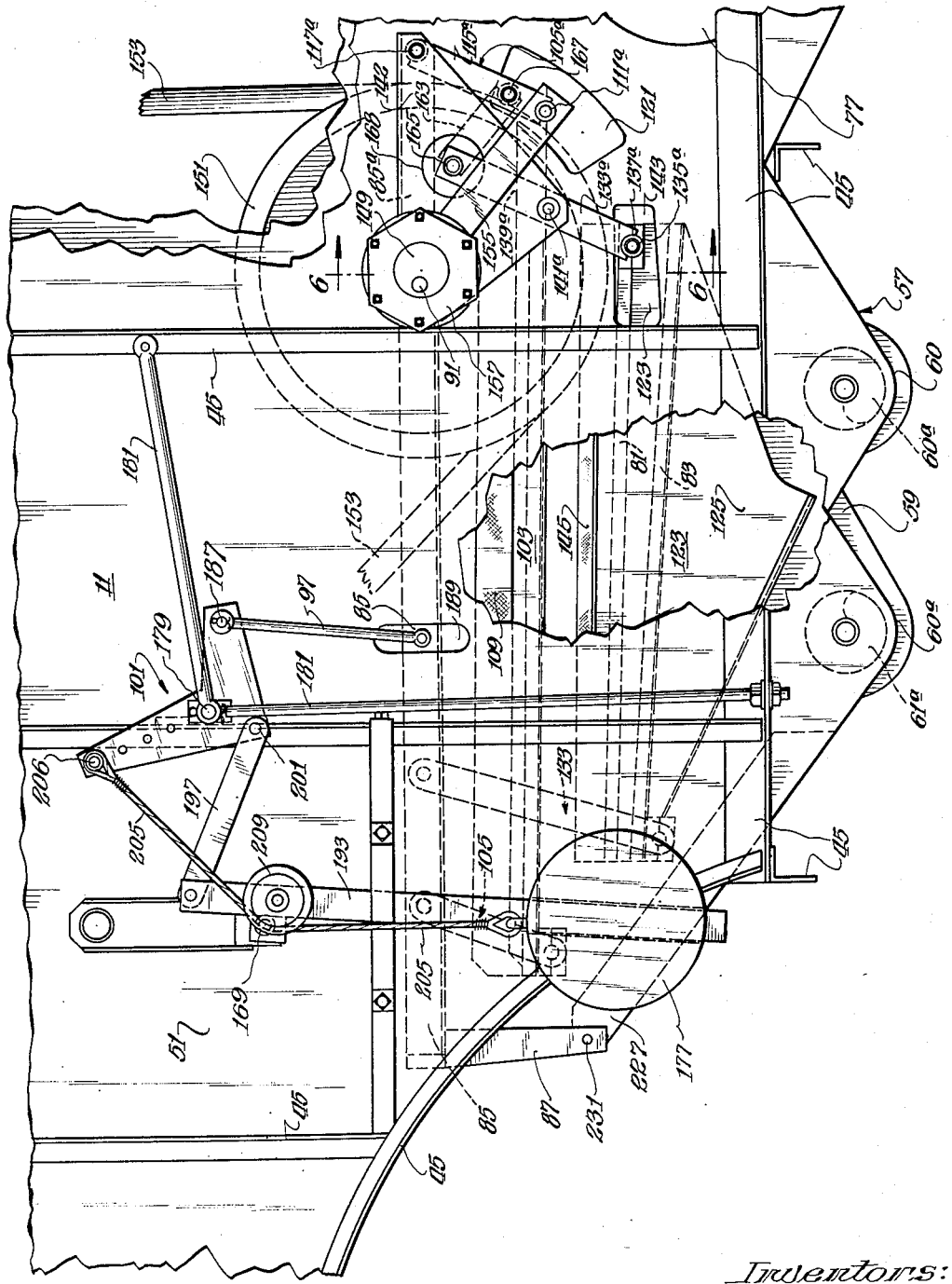

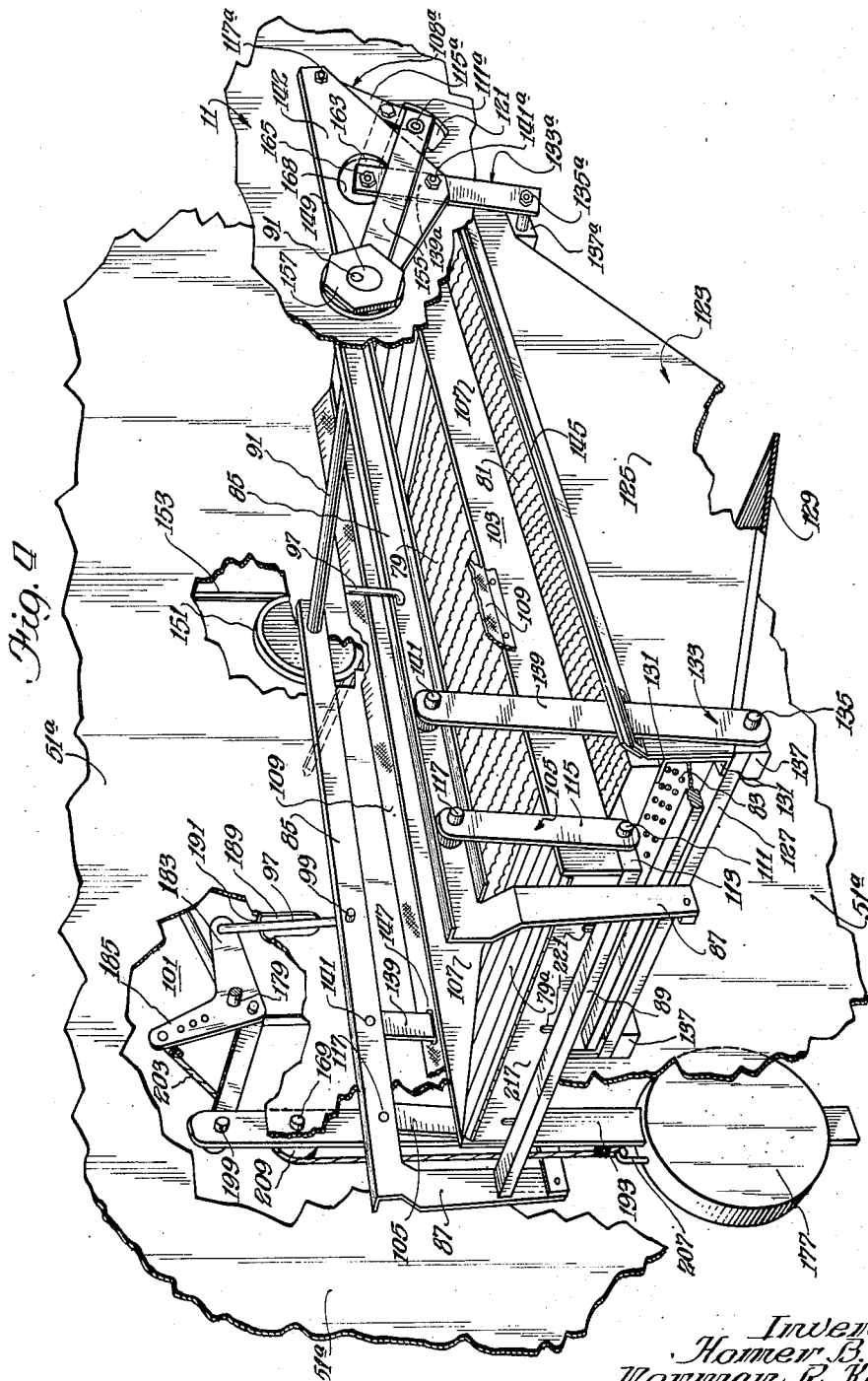

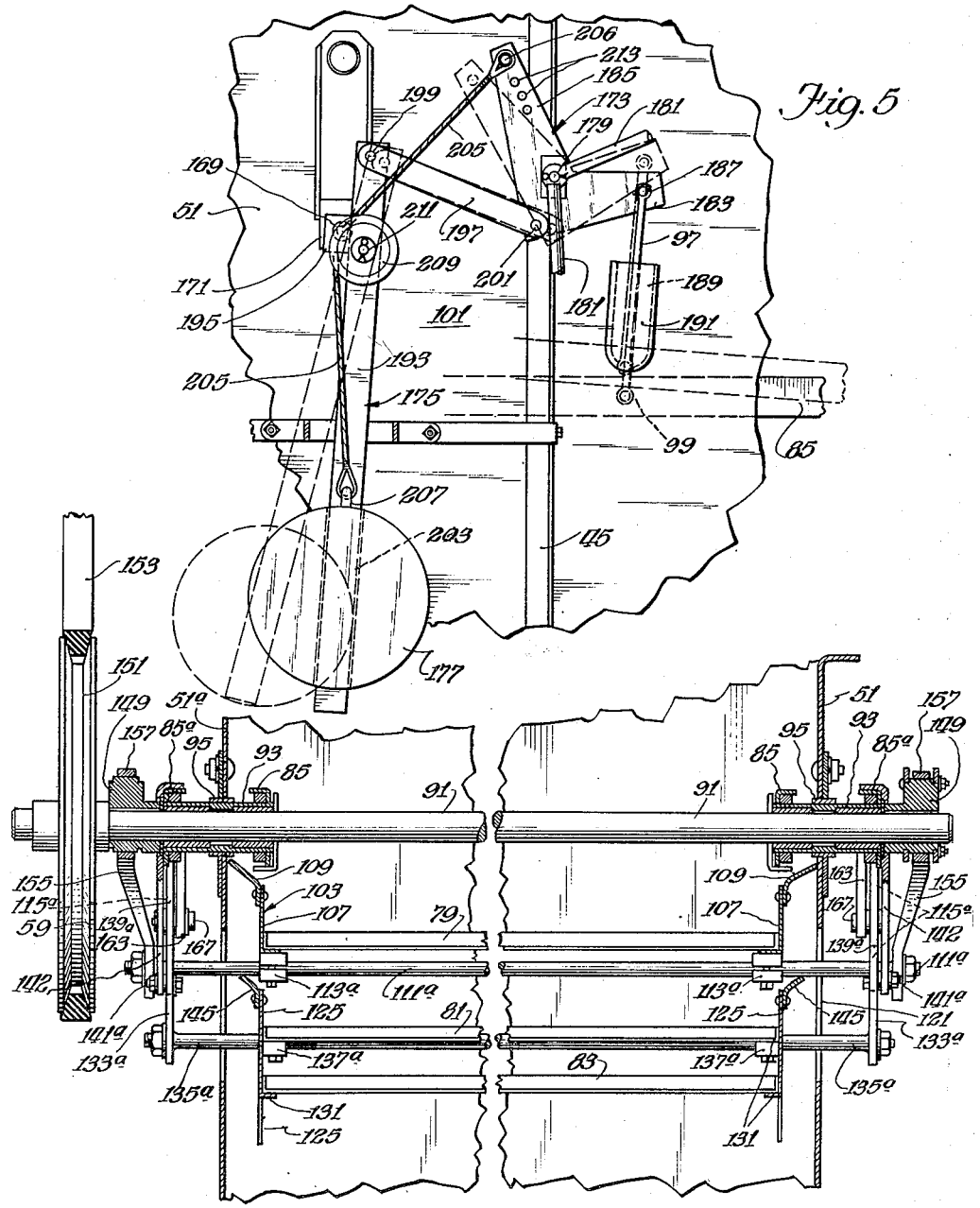

April 20, 1954

H. B. ABER ET AL
COMBINE HAVING AUTOMATIC LEVELING AND
COUNTERBALANCING MEANS FOR SIEVES 2,675,809

Filed May 4, 1949

Inventors:
Homer B. Aber
Norman R. Krause
By: Soans, Pond & Anderson
Attys.

Patented Apr. 20, 1954

2,675,809

UNITED STATES PATENT OFFICE 2,675,809

COMBINE HAVING AUTOMATIC LEVELING AND COUNTERBALANCING MEANS FOR SIEVES

Homer B. Aber and Norman R. Krause, Racine, Wis., assignors to J. I. Case Company, Racine, Wis., a corporation of Wisconsin Application May 4, 1949, Serial No. 91,243

20 Claims. (Cl. 130—27)

The present invention relates generally to an improved combined harvester-thresher or combine, and more particularly it relates to an improved combine of the side-hill type.

In the operation of combines, it is quite important to maintain at least the grain classifying unit of the combine in a substantially level position. The fore and aft or longitudinal leveling is particularly critical since even a slight variation in the relative heights in the ends of the reciprocable sieves which constitute a part of the grain classifying unit, will cause the loss of grain out the rearward end of the machine or will materially decrease the efficiency of the separation of the grain kernels from the straw, chaff, and other foreign materials.

In stationary threshing machines and in combines for level operation, substantially no difficulty is encountered in maintaining the grain classifying unit level. However, this problem is very serious in hill-side operation, not only because of the changing slope of the ground but because of the known variation in the condition of crops grown on different slopes. Heretofore, the problem has been approached by operating the harvester around the hills following the contour lines to maintain the classifying unit in as nearly a horizontal position as possible. Also transverse leveling has been accomplished by moving the support wheels of the harvester up and down to compensate for the slope of the hill.

However, while going around hills during side-hill operation, the harvester very often travels either up or down grade when passing through washes, gullies, or the like, and under these conditions it has been found impossible to maintain various of the harvester elements including the grain classifying unit in the desired horizontal position. Such longitudinal leveling, as has been pointed out above, is quite critical and must be accomplished substantially instantaneously if maximum operating efficiency is to be maintained at all times. Because of the need for instantaneous leveling, the known harvesters for side-hill operation are not wholly satisfactory and the deficiencies of these harvesters is particularly noticeable in larger units.

Accordingly, the principal object of the present invention is the provision of an improved side-hill combine structure and especially an improved self-leveling grain classifying unit which will overcome the deficiencies of the prior art devices. More specific objects of the invention are the provision of an improved supporting frame for the reciprocable sieves which constitute a part of the classifying unit, an improved means for reciprocating these sieves, an improved automatic leveling and counterbalancing means, and an improved means for directing the usual air stream through the grain classifying unit. The above and other objects are accomplished by the provision of an automatic combined leveling and counterbalancing means which acts to maintain the grain classifying unit level during all stages of operation regardless of the amount of grain in the unit and the angle at which the harvester is disposed in the field; by the provision of a plurality of sieve sections which may be reciprocated at different amplitudes so that maximum classifying efficiency will be obtained; and by the provision of a substantially air-tight construction wherein all of the air fed to the classifying unit will be directed through the sieves.

Other objects and advantages of the invention will be made apparent by reference to the following description and the accompanying drawings of a preferred embodiment thereof.

In the drawings:

Fig. 1 is a perspective view of a side-hill harvester-thresher or combine embodying various of the features of the invention;

Fig. 2 is a diagrammatic, elevational view of the combined illustrated in Fig. 1 with parts broken away and in section;

Fig. 3 is an enlarged elevational view, partly in section, showing the construction of the grain classifying unit which constitutes a part of the combine illustrated in the preceding drawings;

Fig. 4 is a diagrammatic, perspective view of the grain classifying unit in Fig. 3, with parts broken away and in section;

Fig. 5 is a fragmentary, elevational view of the grain classifying unit, showing the combined leveling and counterbalancing means employed for maintaining the grain classifying unit in a level position during the operation of the harvester;

Fig. 6 is a sectional view taken on line 6—6 in Fig. 3;

Fig. 7 is an enlarged, fragmentary, elevational view showing the rearward end of the grain classifying structure;

Fig. 8 is a perspective view showing the details of the rearward air seal which forms a part of the classifying unit illustrated in the preceding drawings;

Figure 9:
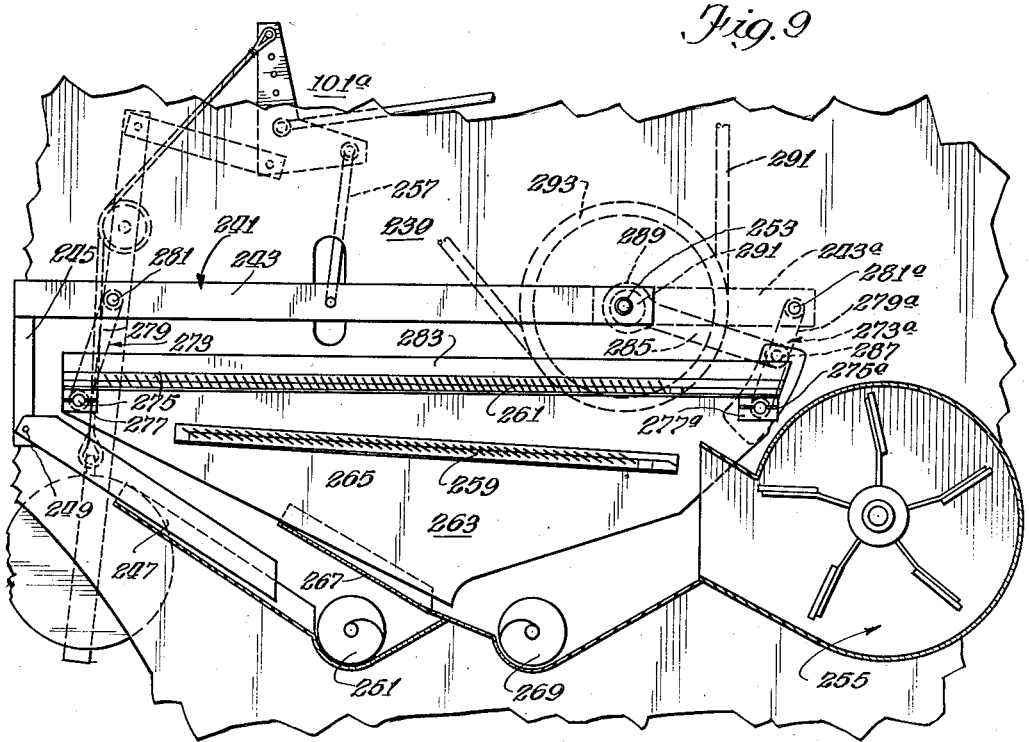
Fig. 9 is a view similar to Fig. 3 showing a modified grain classifying unit.

The harvester-thresher or combine illustrated in the drawings is a representative hill-side type which is adapted to be drawn by a tractor or other draft vehicle. This harvester includes a longitudinally extending, elongated, box-like body section 11 which forms a housing about the threshing mechanism and which serves as a main frame for the implement. The threshing mechanism includes a set of the usual concaves 13 (Fig. 2), a threshing cylinder 15, a plurality of star or beater wheels 17, a cross-slat-type straw rake 19, and a grain classifying unit and related mechanism 21. The body 11 of the harvester is supported upon a pair of support wheels 23 so that the harvester may be moved about a field in the conventional manner, the forward end of the body section 11 being provided with a suitable drawbar 25 for this purpose. During operation, the standing grain is cut by a header 27 which includes the usual cutter bar, grain reel, and conveyor, indicated in Fig. 1 as 28, 29, and 30 respectively, and is moved in the threshing mechanism within the body section 11 of the harvester. The header 27 is hingedly attached to the body of the machine by a horizontally disposed, longitudinally extending pivot (not shown) so that the header 27 is vertically adjustable about the axis of the pivot. This makes possible the adjustment of the header to conform to the contour of the field being harvested. In this connection, the outer end of the header 27 is provided with a support wheel 23a so that the problem of bracing and supporting the header frame structure is minimized. The harvester also may include, as illustrated, a platform 31 for the operator, a gasoline or other suitable engine 32 for operating the various mechanism on the harvester, and a grain bin 33 for storing the threshed grain.

The body 11 of the harvester is adapted to be maintained in a level position transversely of the line of draft by means which is operable to move the support wheels 23 up and down in response to the movement of a control lever (not shown) by the operator. The means which is employed to effect the transverse or sideways leveling of the body section 11 of the harvester may be similar to that disclosed in United States Patent No. 842,638 which was issued to E. R. Gordon and D. R. Throop. In an adjusting mechanism of this type (particularly ilustrated in Fig. 2), each of the support wheels 23 is rotatably supported on one end of a link 35, which link is hingedly attached at its other end to the frame or body 11 of the harvester, as shown at 37 in Fig. 2. The end of the link 35 associated with the support wheel 23 is provided with a vertically disposed, arcuate gear rack 39 which is adapted to be engaged by a pinion gear 41 attached to a transversely extending shaft 43 journalled in the body 11 of the harvester. Rotation of the pinion 41 in response to the operation of the leveling control lever by the operator will move the end of the link 35 associated with the rack 39 up and down relative to the body 11 of the harvester, and this movement when properly controlled will maintain the body of the harvester in a level position transversely of the line of draft. The adjustment of the support wheels 23 on the opposite sides of the harvester is simultaneously effected in opposite directions so that the operator need but move each of the wheels 23 one-half of the distance which would be required for leveling with only one support wheel.

The body 11 of the harvester is box-like and extends generally parallel to the line of draft of the implement. The body 11 is fabricated from sheet material which is reinforced by suitable structural members such as the angle members 45 shown in Fig. 3. The body includes a top panel 47, a bottom panel 49, and a pair of side panels 51 and 51a, these panels being interconnected to form a substantially unitary construction which defines an unobstructed, tunnel-like passageway through the center of the harvester. An inlet opening 53 (Fig. 1) for the incoming crop materials is provided at the forward end of the side section 51 of the body 11 adjacent the outlet of the conveyor 30 which forms a part of the header 27, and an outlet opening 55 is provided at the rearward end of the body 11 for the straw and chaff. The bottom panel 49 of the body, towards the rearward end thereof, is provided with a generally V-shaped well 57 which is adapted to receive the lower portion of the grain classifying unit 21 as is particularly illustrated in Figs. 2 and 9. The well 57 is provided with a dividing ridge 59 which extends transversely of the body 11, and this dividing ridge 59 is adapted to form a pair of troughs 60 and 60a for the grain and tailings augers, 61 and 61a respectively.

The threshing cylinder 15 is rotatably supported within the body of the harvester rearwardly of the inlet opening 53 in suitable bearings (not shown), the cylinder 15 extending transversely of the body 11 and having its axis of rotation disposed in a generally horizontal plane. The concaves 13 are supported below the cylinder 15 in the conventional manner to co-act with the cylinder 15, and an endless, power driven, cross-slat conveyor 63 is disposed intermediate the cylinder 15 and the crop inlet opening 53 to convey the incoming crop to the cylinder 15 and concaves 13 for threshing.

The grain classifying unit 21 which constitutes one of the important features of the illustrated harvester-thresher, is located within the body 11 above the V-shaped well 57 in the bottom panel 49 of the harvester body 11, and the slatted straw rake 19 is disposed above and is vertically spaced from the grain classifying unit 21 in the usual manner. As is particularly illustrated in Fig. 2, a second cross-slat conveyor 65 extends rearwardly from a position under the concaves 13 to a position adjacent the forward end of the straw rake 19. The conveyor 65 moves the straw, chaff, threshed grain, etc., to the classifying unit of the harvester, and the plurality of power driven star or beater wheels 17 is rotatably supported above the conveyor 65 and the straw rake 19 to facilitate the separation of the kernels of grain from the straw and chaff.

The straw rake 19, as before pointed out, is of the endles-conveyor, cross-slat type and extends rearwardly from the outlet of the conveyor 65 to the outlet 55 at the rearward end of the harvester body 11. The endless conveyor which constitutes the straw rake 19 is supported upon and is guided by a plurality of guide rollers 67, and a paddle-type blower is disposed transversely of the harvester body 11 intermediate the upper and lower runs of the endless-conveyor straw rake 19 to provide a blast of air which aids in effectuating the separation of the grain from the straw and chaff.

The grain classifying unit 21 includes a plurality of separating or classifying sieves which are supported above the grain auger 61 and the tailings auger 61a disposed in the lower portion of the V-shaped well 57 in the harvester body 11. In order to provide the stream of air which is necessary to effect the separation of the heavier kernels of grain from the relatively light particles of chaff and straw, a paddle-type blower 71 is located forwardly of the grain classifying unit 21 and is disposed transversely of the harvester body 11. The blower 71 includes a housing 73 having an outlet opening 75 which directs the stream of air from a rotatable paddle element 76 rearwardly and upwardly through the classifying unit 21 and an air inlet opening 77 in each of the side panels 51 and 51a of the harvester body 11. The grain classifying unit 21, illustrated in Figs. 2, 3, 4 and 7, includes three sieves, an upper or chaffer sieve 79 having a chaffer sieve extension 79a, and a pair of classifying sieves 81 and 83. Preferably, the upper or chaffer sieve 79 and the upper of the classifying sieves, 81, are of the adjustable type and are fabricated from a plurality of corrugated sieve sections which are disposed transversely of the harvester body 11, however all three of the sieves may be made adjustable. Each of these sieve sections is of conventional type and may be similar to the sieve section construction shown in U. S. Patent No. 698,258 which was issued to Charles Close. The lower of the classifying sieves, 83, may be of the mesh type or it may be fabricated from a perforated plate of metal or the like whose apertures are of a suitable size for further classifying the grain. A perforated plate-type sieve 83 is illustrated in the drawings.

The means for mounting the sieves within the body of the harvester is one of the important features of this invention. In the embodiment of the harvester illustrated in Figs. 2, 3, and 4, all of the sieves are swingably supported upon a frame which includes a pair of spaced-apart, longitudinally extending members 85 which may be channel shaped, as illustrated. Each of the channel members 85 is disposed longitudinally of the harvester body 11 along the inner surface of one of the side panels 51 and 51a, and the rearward end of each of the channel members 85 is provided with a downwardly extending bracket 87. The brackets 87 are rigidly interconnected by a transversely extending brace 89 which serves to maintain the spacing between the rearward ends of the channel members 85. The interconnected channel members 85 are pivotally supported within the harvester body 11 so as to be swingable about an axis which is defined by a transversely extending shaft 91 disposed adjacent the forward end of the classifying unit 21. As may be seen in Figs. 2 and 3, the shaft 91 is disposed above and slightly to the rear of the outlet 75 of the paddle-type blower 71 which is associated with the classifying unit 21.

In the illustrated harvester, each of the channel members 85 is rigidly attached to a tubular sleeve 93 (Fig. 6), and each of the sleeves extends outwardly through a fixed bearing 95 in one of the side panels 51 and 51a, the shaft 91 being rotatably journalled into the central opening of the sleeves 93. Thus, the tubular sleeves 93 are free to rotate in the fixed bearings 95 and the shaft 91 is free to rotate independently of the channel members 85 within the sleeves 93. A short, forwardly disposed extension 85a for each of the channel members 85 is rigidly attached to the portion of the tubular sleeve 93 which is disposed outside of the side panels 51 and 51a of the body 11. The extensions 85a may also be channel shaped as illustrated. The supporting frame for the sieve sections thus extends rearwardly of the shaft 91 within the body 11 and forwardly of the shaft 91 on the outside of the harvester body 11.

The channel members 85 and the extensions 85a constitute the main support frame for the grain classifying unit. The channel members 85 are longer than the channel extensions 85a and, as a result, the center of gravity of the classifying unit 21 is disposed rearwardly of the pivot formed by the fixed bearing 95 and the rotatable sleeve 93. An upwardly extending hanger rod 97 (Fig. 3) is pivotally attached by a transversely extending, horizontally disposed pivot 99 to each of the channel members 85 adjacent the rearward ends thereof. The upper end of each of the hanger rods 97 is pivotally attached to a combined counter-balancing and leveling assembly 101 which constitutes another important feature of the illustrated harvester. The combined counterbalancing and leveling mechanism 101 is adapted to automatically level the classifying unit 21 longitudinally of the harvester as will hereinafter be more fully described.

The chaffer sieve 79 and the chaffer sieve extension 79a are supported within a generally rectangular frame 103 which is swingably supported upon the channel members 85 by a pair of bail-like hangers 105 and 105a. The frame 103 includes a pair of longitudinally extending side members 107 which are mechanically interconnected by suitable bracing members (not shown). The side members 107 are spaced apart so that they fit freely within the harvester body 11, and a strip 109 of sealing material, such as canvas, rubber filled fabric, or the like, is attached to each of the side members 107 along the upper edge thereof to prevent the passage of air or crop materials between the sides of the frame 103 and the side panels 51 and 51a of the harvester. In this connection, the strips 109 are disposed upwardly and outwardly to engage the side panels 51 and 51a as illustrated in Figs. 3, 4, and 7.

The bail-like hanger 105 includes a cross member 111 which is adapted to be journalled into a pair of spaced apart bearings 113 on the chaffer sieve frame 103. A pair of parallel supporting links 115 are attached to and extend radially outwardly from the opposite ends of the cross member 111, and the outer end of each of the links 115 is rotatably attached to the rearward ends of the channel members 85, forwardly of the brackets 87, by transversely extending, horizontally disposed pivots 117. The cross member 111 is proportioned to swing freely within the harvester body 11 to permit fore and aft movement of the chaffer sieve frame and the associated sieve 79 and extension 79a. The forward end of the chaffer sieve frame is swingably supported upon the forward ends of the channel member extensions 85a by the bail-like hanger 105a (Fig. 3). The hanger 105a includes a cross member 111a to which is attached a pair of spaced apart, radially extending links 115a. The links 115a are substantially the same length as the links 115 so that the chaffer sieve will be supported in parallel relation with the channel members 85. The outer ends of each of the links 115a are pivotally attched to the forward ends of one of the channel member extensions 85a by a transversely disposed, horizontally extending pivot 117a. The cross member 111a is rotatably journalled in suitable bearings 113a at the forward end of the chaffer sieve frame 103 and, as illustrated particularly in Fig. 6, the cross member 111a extends outwardly through an aperture 121 in the side panels 51 and 51a of the harvester body 11 so that the links 115a may extend upwardly to connect with the channel member extensions 85a.

The apertures 121 (Fig. 3) are proportioned to permit up and down and fore and aft movement of the chaffer frame 103 relative to the harvester body 11, and the bail-like hangers 105 and 105a provide a parallel linkage which will maintain the chaffer sieve frame 103 parallel to the channel members 85 at all times during the reciprocation of the sieve 79. In addition, fore and aft swinging of the chaffer frame 103 and the associated sieve on the bail-like hangers 105 and 105a will cause a uniform up and down movement of the sieve 79 and the extension 79a which increases the cleaning or classifying effect in the mechanism.

The classifying sieves 81 and 83 are adapted to be supported one above the other and constitute the main operating portions of a unitary cleaning shoe 123 which is swingably supported from the channel members 85. The cleaning shoe 123 is of fabricated construction and includes a pair of generally triangular shaped side members 125 which are interconnected by transversely extending, horizontally disposed bracing members 127 (Fig. 4) in a manner such that a rigid structure is produced. The side members 125 are generally parallel to the side panels 51 and 51a of the harvester body 11 and a sloping plate 129, which provides a shoe floor, is attached intermediate the lower rearward edges of the triangularly shaped side members 125 to form a chute which is adapted to deliver the grain falling through the sieves 81 and 83 into the grain auger trough 69 in the well 57. Suitable guideways and reinforcing members 131 (Fig. 6) are disposed along each of the side members 125 to form a rack for supporting the classifying sieves 81 and 83 in parallel, vertically spaced apart relationship.

The cleaning shoe 123 with its associated sieves 81 and 83 is also suspended from the channel members 85 by a pair of bail-like hangers 133 and 133a (Fig. 4) which are similar to the hangers 105 and 105a described in connection with the chaffer sieve supporting means. The bail-like hanger 133 comprises a cross member 135 which is adapted to be journalled into a pair of spaced-apart bearings 137 on the rearward end of the cleaning shoe 123. A pair of parallel supporting links 139 are attached to and extend radially outwardly from the opposite ends of the cross member 135, and the outer end of each of the links 139 is rotatably attached to the rearward ends of the channel members 85, forwardly of the pivots 117, by a transversely extending, horizontally disposed pivot 141. The cross member 135 is proportioned so that it extends beyond the chaffer sieve frame 103 thereby positioning the links 139 outwardly of that frame to permit the free swinging of the shoe 123 in the fore and aft direction. The forward end of the cleaning shoe 123 is swingably supported, by a hanger 133a, upon a depending, triangular-shaped plate 142 whose upper portion is fixedly attached to the forward ends of the channel member extension 85a. The hanger 133a includes a cross member 135a to which is attached a pair of spaced apart, radially extending links 139a. The links 139a are the same lengths as the links 139 and the sieves 81 and 83 associated with the shoe 123 are supported in generally parallel relation with the chaffer sieve 79. Each of the links 139a intermediate its ends is pivotally attached to the lower portion of the triangularly-shaped plate 142 by means of a transversely extending, horizontally disposed pivot 141a. The pivot 141a is thereby disposed below and to the rear of the pivot 117a. The cross member 135a is rotatably journalled in suitable bearings 137a on the forward end of the chaffer sieve as illustrated. The cross member 135a extends outwardly through an aperture 143 in the side panels 51 and 51a of the harvester body 11 and is proportioned so that the links 139a will extend upwardly between the harvester body 11 and the depending plate 141a as illustrated.

In order that substantially all of the air from the blower shall pass through the various sieves, the side members 125 of the cleaning shoe 123 are extended upwardly above the sieve 81 and a strip of resilient sealing material 145 such as canvas or the like is attached to this extension (Figs. 4 and 6). The strip 145 is similar to the sealing strip 109 described in connection with the chaffer sieve frame 103 and extends upwardly and outwardly to provide a sliding contact with the side panels 51 and 51a of the harvester body 11. Of course, the sealing strips 109 and 145 are provided with suitable spaced slots 147 (Fig. 4) for permitting the supporting links 115 and 139 for the chaffer sieve 79 and the cleaning shoe 123, respectively, to pass therethrough.

It is desirable, if the most efficient separation of grain is to be effected, to reciprocate the chaffer sieve 79 and the cleaning shoe 123 at different amplitudes and to maintain the amplitude of reciprocation constant for all of the positions of the grain classifying unit 21 relative to the harvester body 11 during operation. Particularly efficient grain separation is effected by reciprocating the chaffer sieve 79 and the cleaning shoe 123 in opposite directions, i. e. so that as the chaffer sieve 79 is moving forwardly the cleaning shoe 123 is moved rearwardly. In the illustrated harvester, the preferred operating conditions are obtained by driving the reciprocating means for the sieves from the shaft 91 and by providing linkage means for reciprocating the sieves which will be operable to impart the desired motion to the sieves.

As shown particularly in Fig. 6, an eccentric 149 is attached to each end of the shaft 91 outwardly of the tubular sleeves 93. A pulley 151 is attached to one end of the shaft 91 and this pulley 151 is operatively connected to the driving motor 32 (Fig. 1) by a V-belt 153. The operative connection between the eccentric 149 and the sieve 79 and the shoe 123 is effected by a pair of actuating arms 155 (Fig. 3) each of which carries at one end a bearing 157 which is adapted to operatively engage one of the circular eccentrics 149. The other end of each of the arms 155 is pivotally connected to an extension of the cross member 111a at the lower end of the supporting link 105a as illustrated in Figs. 2, 3, and 4. The central portion of the link 115a is connected to the upper end of the supporting link 139a for the cleaning shoe 123 by a rearwardly extending link member 163. The connection between the link member 163 and the supporting link 139a for the cleaning shoe is accomplished by means of a transversely extending, horizontally disposed pivot 165, and the connection between the link 115a and the other end of the link member 163 includes a horizontally disposed, transversely extending pivot 167. As may be seen from the drawings, Figs. 2, 3, and 4, an aperture 168 is provided in each of the triangular-shaped plates 142 to permit the inspection and maintenance of the pivotal connection 165, this connection being disposed between the plate 142 and the harvester body 11. Similar connections are made on each side of the harvester so that the force which is supplied for reciprocating the cleaning shoe 123 and the chaffer sieve 79 is transmitted equally to both sides of the unit thus making possible the even reciprocation of the sieves and thereby avoiding fatigue failures and other structural defects which might occur.

The actuating arm 155 and the link 163 are proportioned so that the supporting links 115, 115a, 139 and 139a are inclined to the vertical when the arm 155 is in the forwardmost position. This arrangement insures that the sieve 79 and the shoe 123 will swing upwardly and rearwardly under the actuation of the eccentric 149, and that the material deposited on the sieve and shoe will be shifted only rearwardly by the reciprocal motion of those elements.

While the structure which is illustrated includes an actuating eccentric whose axis is coaxial with the cross shaft 91, other drive means for the sieves may be employed. For example, a driving element such as a pulley can be located coaxially with the pivot point for the sieve supporting frame and this element can be operatively connected to an eccentric or other actuating means on another part of the sieve supporting frame. This driving element would be operatively connected to the source of driving power on the tractor.

The supporting means and the means for reciprocating the sieves which has been described, co-operate with one another to effect the reciprocating movement of the sieves at a constant amplitude and in a constant pattern regardless of the position of the sieves with respect to the harvester body. This improved operation results in part from the feature of driving the means for reciprocating the sieves from a power element which is concentric with the transverse axis of the sieve frames, thereby enabling the supporting frames for the sieves and the drive means to move as a unit whenever it becomes necessary to adjust the position of the sieves within the body of the harvester to compensate for the incline of the hill on which the harvester is being operated. In addition, the support means which has been described permits the pivot point for the classifying unit to be disposed well forwardly in the harvester closely adjacent to the blower which supplies the stream of air which is necessary to effect the separation of the grain from the lighter particles of straw and chaff. When the pivot point is at the forward end of the classifying unit and located substantially directly above the blower outlet, movement of the separator mechanism relative to the body of the harvester does not substantially affect the delivery of air from the fixedly positioned blower. Further, this location of the pivot point for the classifying unit causes the blast of air from the blower to impinge upon the forward end of the sieves when the combine is going down hill and upon the rearward end of the sieves when the combine is traveling up hill. The effect of varying the direction of the air blast will be discussed in greater detail in a subsequent paragraph.

The complex up and down and fore and aft movement which is imparted to the sieves during operation makes possible efficient grain separation under even the most adverse operating conditions, and by changing the lengths of the supporting and connecting links various complex sieve motions may be obtained which are advantageous for certain crop conditions. The opposed reciprocation of the chaffer sieve and the cleaning shoe causes one of the sieves to be moving upwardly while the other is moving downwardly resulting in a pulsating flow of air through the sieves which appears to increase the cleaning or classifying effect of the sieves. Further, the opposed motion of the sieves and cleaning shoe insures that any particles of straw which may become wedged between a pair of the sieves will be broken off and will be blown out the outlet in the rearward end of the harvester.

Particularly efficient grain classification has been effected in one commercial embodiment of the invention wherein the supporting links 105 and 105a for the chaffer sieve 79 produced a 7 inch radius of swing, the supporting link 139 for the cleaning shoe 123 produced about a 14½ inch radius of swing, and the length of the link 139a between the pivots 141a and 135a was about 6½ inches. The throw of the eccentric 149 was about 0.93 inch (total oscillation of about 1.87 inches) and the eccentric 149 was rotated at a speed of about 250 R. P. M. In this embodiment of the invention the connection between the supporting link 139a for the shoe 123 and supporting link 105a for the chaffer frame was about 2.94 inches above the pivotal connection between the link 105a and the chaffer sieve frame 103, and the connection between the link member 163 and the supporting link 139a for the cleaning shoe 123 was made at a point about 8.0 inches above the pivotal connection between that supporting link, 139a, and the plate 142. The movement effected by such a connection in addition to providing for fore and aft reciprocation of the shoe 123 and the chaffer sieve 79 results in a limited up and down movement of the sieves, while maintaining them in planes which are generally parallel to the channel members 85, and as the chaffer sieve is moving in one direction longitudinally of the harvester body 11, the shoe 123 is moving in the opposite direction. In the commercial embodiment of the invention which is described above, the amplitude of the fore and aft movement of the chaffer sieve is about $1\frac{23}{32}$ inches, and the amplitude of the vertical movement is about $\frac{23}{32}$ inch; and the amplitude of the fore and aft movement of the cleaning shoe 123 is about $1\frac{5}{32}$ inches and the amplitude of the vertical movement is about $\frac{13}{32}$ inch. This complex movement seems to increase the cleaning effect in the classifying unit and increases the efficiency of the separation of the grain from other materials under substantially all operating conditions.

In addition to effecting highly efficient grain classification, the movements of the sieves which as before pointed out, are in opposite directions, tend to cancel or to nullify any unbalanced forces which result from the reciprocation. This cancellation of unbalanced forces results in smooth, substantially vibration-free operation which greatly prolongs the life of the moving elements.

In order to maintain the classifying unit 21 in a level position longitudinally of the harvester body 11, the rearward end of that mechanism is interconnected with the combined counterbalancing and leveling means 101 by means of the hanger rods 97. This combined counterbalancing and leveling means, which is particularly shown in Figs. 3 4, and 5, constitutes another of the important features of the illustrated harvester. The means 101 includes a pair of pendulum units one of which is disposed on each side of the harvester and which are interconnected by a transversely extending, horizontally disposed shaft 169 which is rotatably journalled in fixed bearings 171 in each of the side panels 51 and 51a. Each pendulum unit includes a bell crank lever 173 (Fig. 5) which is adapted to be connected to the upper end of one of the hanger rods 97, and the bell crank lever 173 is adapted to be connected to a pendulum 175 which includes a variably positionable weight 177. Since both of the pendulum units are of the same construction only one of them will be described.

The bell crank lever 173 which is interconnected with the hanger rod 97 is rotatably supported upon a stub shaft 179 which extends outwardly from the side panel 51 of the harvester body 11. The outer end of the stub shaft 179 is supported by a suitable forwardly and downwardly extending bracing member 181 which is connected to the reinforcing member 45 of the harvester frame. The bell crank lever 173 includes a forwardly extending arm 183 and an upwardly extending arm 185. The forwardly extending arm 183 is pivotally connected to the upper end of the hanger rod 97 by means of a transversely extending pivot 187, the rod 97 extending outwardly from the channel member 85 through the side panel 51 of the harvester. As may be seen in Figs. 3, 4, and 5, a suitable aperture 189 is provided for the rod 97 in the side panel 51, and this aperture 189 is protectively surrounded by a guard shield 191.

The pendulum 175 which controls the combined counterbalancing and leveling mechanism 101 includes a pendulum arm 193 which is provided with a mounting plate 195 adjacent its upper end. The mounting plate 195 is adapted to be rigidly attached to one of the ends of the rotatable supporting shaft 169. The pendulum arm 193 is thus free to swing with the shaft 169 as its center of rotation and is offset from the axis of rotation due to the position of the mounting plate 195. The upper end of the pendulum arm 193, at a point spaced above the mounting plate 195, is connected to a point on the bell crank lever 173 which is substantially directly beneath and which is spaced from the stub shaft 179 about which the bell crank lever 173 is rotatable. The relative positions of the stub shaft 179 and the connection to the pendulum arm 193 is clearly shown in Fig. 5. This connection is effected by a compression resisting link 197 which is pivotally attached to the upper end of the arm 193 by a transversely extending, horizontally disposed pivot 199 and to the bell crank lever 173 by a transversely extending, horizontally disposed pivot 201.

The pendulum weight 177 is disk shaped and may be fabricated from cast iron or the like. The weight 177 is fabricated with a diametrically disposed slot or passageway 203 which is proportioned to permit the weight 177 to slide up and down along the pendulum arm 193. A flexible cable 205 is provided to interconnect the weight 177 and the upwardly extending arm 185 of the bell crank lever 183 at a point 206. In this connection, the weight 177 is provided with a ring 207 for facilitating the attachment of the cable 205 to the weight 177. Desirably, as illustrated, a grooved pulley 209 is rotatably supported upon a stub shaft 211 which extends outwardly from the pendulum arm 193 adjacent the mounting plate 195, and the pulley 209 is positioned so that its rim lies closely adjacent to the axis of rotation of the pendulum unit supporting shaft 169. The cable 205 which connects the weight 177 and the upwardly extending arm 185 of the bell crank lever 183 is trained about this pulley and thereby passes through the center of rotation of the pendulum arm 193.

The combined counterbalancing and leveling mechanism 101 which has been described in the foregoing, is operable to automatically compensate for the changes in level of the grain classifying unit 21 which occur when the longitudinal axis of the harvester is inclined from the horizontal due to passing over sloping terrain. The various links in the counterbalancing and leveling mechanism 101 may be proportioned to obtain various leveling and counterbalancing effects, and in this connection, it is desirable to provide the upwardly extending arm 185 of the bell crank lever 183 with a plurality of spaced apart holes 213 for attaching the flexible cable 205 to various positions along that arm. It may be seen from the drawings, particularly Fig. 5, that as the rearward end of the classifying unit 21 moves up and down relative to the harvester body 11 in response to the movement of the pendulum units, the effective forces produced by the lever arms continuously change to effect automatic compensation for the different positions of the classifying unit 21 and for different weights of material in that unit, thereby insuring efficient leveling action under all operating conditions.

Figure 10:
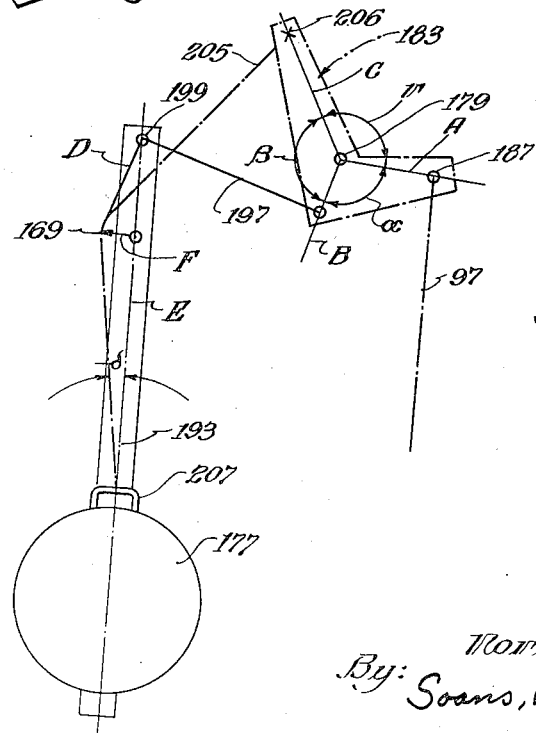
Fig. 10 is a diagrammatic view similar to Fig. 5.

In one commercial embodiment of the invention particularly effective leveling action was obtained on uphill grades as great as 23 per cent or on downhill grades as great as 13 per cent when the effective lever arms of the various links were proportioned as follows when the mechanism was in the neutral position. (The effective lever arm is the length of a perpendicular from a pivot point to the line of reaction of a lever or cable.) The length of the effective lever arm between the stub shaft 179, the pivot for the bell crank lever 183, and the hanger rod 97, indicated as line A on Fig. 10 when the apparatus is in the neutral or level position, is 6.0 inches. The length of the effective lever arm between the stub shaft 179 and the compression resisting link 197, indicated as B in Fig. 10, is 3.4 inches, and the effective lever arm between the flexible cable 205 and the stub shaft 179, indicated as line C in Fig. 10, is 7.6 inches. The angular displacement between the effective lever arms A and B, indicated as angle $\alpha$ in Fig. 10, is 110°, and the angle between the effective lever arms B and C, indicated as $\beta$ in Fig. 10, is 110°. Of course, the remaining angle, the angle between lever arms A and C angle $\gamma$ in Fig. 10 is 140°. Considering the effective lever arms about the axis of rotation defined by cross shaft 169 in this commercial embodiment, the effective lever arm between the shaft 169 and the link 197, indicated as D in Fig. 10, is 5.5 inches, and the perpendicular distance (F in Fig. 10) between the axis of rotation of the shaft 169 and the center line of the perpendicular 193, indicated as E in Fig. 10, is 11.5 inches. The pendulum weight 177 weighs about 74 pounds and the cable 205 makes an angle with the center line of the pendulum, indicated as angle $\delta$ in Fig. 10 of 5 degrees. Of course, it will be understood that one of these pendulum units is disposed on each side of the implement and that they are interconnected to operate in unison.

The feature of employing a pair of pendulum units insures the stability of the classifying unit 21 and together with the related counterbalanced drive mechanism effectively prevents the transmission of vibrations from the reciprocating members of the classifying unit 21 to the counterbalancing and leveling means 101.

In the event that the swingably supported sieves reach their limit of compensation as a result of an uphill or downhill grade in excess of that for which the particular harvester has been designed, the air blast from the blower is automatically directed onto the portion of the sieve which will provide the maximum separating efficiency for the temporary, abnormal condition. For example, if the harvester is traveling on an uphill grade which is beyond the range of the compensating mechanism, the blast of air from the blower will be directed upon the rearward end of the sieves. This will tend to clean the grain which slides along the sieves due to the uphill angle which is assumed by the sieves. Conversely, if the harvester is traveling on a downhill grade which is excessive, the blast of air will be directed on the forward end of the sieves and thus will tend to effectively clean the extra grain which will accumulate on that portion of the sieve due to the lowered position of the forward end of the sieves.

Another of the important features of the illustrated harvester is the means which are provided for supporting the rearward end of the chaffer sieve extension 79a in the chaffer sieve frame 103 and for causing the stream of air from the blower 71 to pass upwardly through the chaffer sieve 79 and the chaffer sieve extension 79a. The supporting means for the rearward end of the chaffer extension 79a includes a transversely extending brace 215 (Figs. 7 and 8) which is rigidly attached to the side members 107 of the box-like chaffer sieve frame 103. The support for the rearward end of the chaffer extension 79a comprises a flat panel 217 of metal or the like which is hingedly attached to the chaffer sieve extension 79a by means of a transversely extending, continuous hinge 219. The panel 217 is provided with a plurality of vertically extending, transversely spaced apart slots 221 and a plurality of wing bolts 223 are provided which extend through the slots 221 in the panel 217 and a plurality of holes in the brace 215 which are spaced apart to register with the slots 221. It may be seen from the drawings (Figs. 7 and 8) that the angular relation of the chaffer extension 79a to the box-like chaffer frame 103 may be selectively adjusted by loosening the wing bolts 223 and sliding the panel 217 up or down relative to the brace 215 and then locking the panel 217 to the brace 215 in the desired position.

A seal for the space between the panel 217 and the rearward end of the bottom panel 49 of the harvester is provided by means of a downwardly extending canvas flap 225 which interconnects the chaffer sieve extension-support-panel 217 with a panel 227 which is hingedly attached to the downwardly extending braces 87 at the rearward end of the channel members 85 for the grain classifying unit 21. As shown in Fig. 7 the sealing panel 227 is provided with a pair of lugs 229 which are hingedly attached to the brackets 87 by transversely extending, horizontally disposed hinge pins 231. The forward edge of the sealing panel 227 is adapted to rest upon the rearward end of the bottom panel 49 of the harvester body 11 thereby effectuating a seal which prevents the outward flow of air from the classifying unit 21 at a point below the chaffer sieve 79. The upper edge of the canvas flap 225 is connected to the panel 217 by means of a wing nut and slot connection, as illustrated at 233 in Fig. 8, to permit adjustment of the flap 225.

During operation of the harvester in the field, the implement is drawn by an associated tractor or other draft vehicle at a ground speed which is proportional to the condition of the grain in the field. The standing stalks of grain are cut by the header 27 and are conveyed to the inlet opening 53 in the harvester body by the conveyor 30. The grain and the attached stalks fall upon the conveyor 63 and are carried rearwardly within the harvester body 11 to the rapidly rotating threshing cylinder 15 with its associated concaves 13. The action of the threshing cylinder 15 and the concaves 13 effectively removes the kernels of grain from the stalks, and the mass of grain and straw is removed rearwardly and upwardly by the straw carrier rake 19 and to the classifying unit 21 by the conveyor 65. The rotating star wheels or beater rolls 17 which are disposed above the conveyor 65, act upon the mass of straw and grain on the conveyor to break any bonds which may remain between the straw and the kernels of grain.

The straw is carried rearwardly to a discharge point by the straw carrier rake 19 and is subjected to the action of the pluraltiy of beater rolls and star wheels 17 which cause the kernels of grain to fall into the classifying unit 21.

The classifying unit 21 which includes the sieves 79, 81, and 83, is rapidly reciprocated by the linkage which has been described, and the kernels of grain fall downwardly against the stream of air from the blower 71 while the chaff and other relatively light particles of foreign material are carried upwardly with the stream of air and are discharged out the rearward end of the harvester. The kernels of grain fall downwardly into the grain trough 60 and are conveyed to one side of the implement by a grain auger 61. From this point the grain is moved upwardly to the grain bin 33. The tailings, that is, particles which are lighter than the grain but which are heavier than the chaff such as unthreshed heads or parts thereof, fall rearwardly of the cleaning shoe 123 and are directed by the hinged sealing plate 227 into the tailings trough 60a. The tailings are carried to one side of the implement by the tailings auger 61a and are returned to the threshing cylinder 15 for further processing, by the conveyor 237.

While the grain classifying unit 21 which has been described in the foregoing is operable to effect the classification and separation of the grain from straw, chaff and other foreign particles very efficiently under substantially all operating conditions, the mechanism is particularly adapted for use with large-sized hill-side combines. However, some of the features of the invention may be combined to produce a self leveling grain classifying unit which is particularly adapted to be incorporated in a relatively inexpensive small-sized, side-hill combine. A grain classifying unit 239, which is in many respects similar to the classifying unit 21, is illustrated in Fig. 9, and the unit 239 is particularly adaptable for the construction of small-sized hill-side combines. Since the construction of the grain classifying unit 239 is similar to the construction of the grain classifying unit 21 some of its features will not be described in great detail.

The classifying unit 239 includes a swingably supported frame 241 which includes a pair of mechanically interconnected, longitudinally extending members 243 each of which is disposed longitudinally of the harvester body along the inner surface of each of the side panels. The rearward end of each of the members 243 is provided with a downwardly extending bracket 245, and a sealing plate 247 which is hingedly attached to the pair of brackets 245 by transversely extending pivots 249. The sealing plate 247 is also adapted to direct the tailings downwardly into the tailings auger 251. The members 243 are pivotally supported within the harvester body for movement about an axis which is defined by a transversely extending shaft 253 disposed adjacent the forward end of the classifying unit 239 and this shaft is disposed substantially above the outlet of a conventional paddle-type blower 255 which is provided for furnishing a stream of air for the separator mechanism. Each of the members 243 is provided with a pair of offset, forwardly extending extensions 243a which are disposed outside of the side panels of the harvester body. This construction is substantially the same as the construction of the channel members 85 and the channel member extensions 85a.

An upwardly extending hanger rod 257 is pivotally attached to each of the members 243 towards the rearward end thereof, as illustrated, and the upper end of each of the hanger rods 257 is pivotally attached to a combined counterbalancing and leveling assembly 101a which is the same as the counterbalancing and leveling assembly 101.

In the classifying unit illustrated, only two sieves 259 and 261 are utilized, and both of these sieves are of the adjustable type. The sieves 259 and 261 are supported within a unitary shoe 263 which is of fabricated construction. The shoe includes a pair of generally triangular shaped side members 265 which are interconnected by transversely extending bracing members (not shown) to produce a rigid structure. The chaffer sieve 261 is supported along the upper portion of the shoe 263 and the lower sieve 259 is disposed below and slightly forwardly of the chaffer sieve 261. A deflector plate 267 is attached intermediate the side members 265 adjacent the lower portions thereof to direct the kernels of grain which fall through the lower or grain sieve, 259, to the grain auger 269. The deflector plate 267 does not extend upwardly to completely cover the rearward edges of the side members 265 since it is necessary to provide a space which will permit the tailings to fall into the tailings auger 251. The deflector plate 267 is desirably attached to the side members 265 by a transversely extending hinge 271 so that the deflector plate 267 will bear against the bottom panel of the housing when the shoe is reciprocated.

The shoe 263 with its associated sieves 259 and 261 is suspended from the members 243 and 243a by a pair of bail-like hangers 273 and 273a which are similar to the hangers 133 and 133a which have been described in connection with the cleaning shoe 123. The bail-like hanger 273 comprises a cross member 275 which is adapted to be journalled into a pair of spaced apart bearings 277 on the rearward end of the shoe 263. A pair of parallel links 279 are attached to and extend upwardly from the cross member 275 to the members 243 to which they are pivotally attached by transversely extending, horizontally disposed pivots 281.

The forward end of the shoe 263 is swingably supported upon the forward ends of the extensions 243a by the bail-like hanger 273a which includes a cross member 275a to which is attached a pair of spaced apart links 279a. The links 279a are the same length as the links 279 so that the shoe 263 is supported in generally parallel relation to the members 243. The outer ends of each of the links 279a are attached to the forward ends of the extensions 243a by transversely extending pivots 281a, and the cross member 275a is rotatably journalled in suitable bearings 277a on the forward end of the shoe 263, as illustrated in Fig. 9. A canvas strip 283 is, of course, attached along the upper edge of each of the side members 265 to engage the side panels of the harvester body, thereby causing all of the air from the blower 255 to pass through the sieves 259 and 261.

The shoe 263 is reciprocated as a unit from the shaft 253 by means of an actuating arm 285 which is pivotally attached to the central portion of the links 279a by transversely extending pivot 287. The rearward end of the arm 285 carries a circular bearing or strap 289 in which is journalled an eccentric 291 which is attached to the cross shaft 253. During operation, the shaft 253 is rotated by a suitable source of power which may be connected to the shaft 253 by the belt 291 and pulley 293, illustrated, or by other suitable means.

It will be seen that during operation, the sieves 259 and 261 will be reciprocated a constant amount regardless of the angular position of the shoe 263 relative to the harvester body. During operation in a rough or hilly field, the longitudinal axis of the shoe 263 will be maintained in a horizontally disposed position through the action of the combined counterbalancing and leveling mechanism 101a. In a small-sized harvester it is sometimes possible to employ a leveling unit which is actuated by a single pendulum and an actuating unit which includes but one actuating arm, however, for preferred operation, a pair of pendulum units and a pair of actuating arms should be employed.

In the foregoing an improved harvester-thresher for hill-side operation has been described which includes means for automatically leveling the grain classifying unit when the combine is operated in rough or hilly fields. Further, the leveling mechanism is operable to automatically compensate for the various amounts of grain which may be present in the classifying unit during operation. This operation is effected with a minimum number of parts which require a minimum amount of maintenance.

In a harvester embodying all of the advantageous features of the invention, there is also incorporated highly improved means for reciprocating the sieves which form a part of the grain classifying unit. The sieves are reciprocated with a complex motion which combines both a fore and aft and an up and down movement. The combined counterbalancing and leveling mechanism and the means for reciprocating the sieves co-act to cause the uniform reciprocation of the sieve sections regardless of the relative angular positions of the harvester body and the classifying unit.

Improved operation of the harvester also results from the feature of disposing the pivot for the classifying unit closely adjacent to the outlet of the blower which provides the stream of air necessary to effect the separation of the relatively heavy kernels of grain from the lighter particles of chaff and straw. Another important feature of the illustrated harvester is the means for directing the stream of air upwardly through the sieve sections without waste and of providing a flexible seal intermediate the chaffer sieve and the bottom panel of the harvester, regardless of the movement of the sieves and their position within the harvester body.

Various features of the invention which are believed to be new are set forth in the appended claims.

We claim:

1. In combination in a grain classifying unit, a frame which includes a pair of parallel, spaced apart, mechanically interconnected members, means for supporting said frame for hinged movement about a horizontally disposed axis, at least one classifying sieve, links for supporting said sieve on said longitudinally extending members for reciprocation relative to said members, and means for reciprocating said sieve at a predetermined constant amplitude regardless of the position of said frame relative to said axis, said links being inclined only to the same one side of the vertical throughout said reciprocation whereby said reciprocation is effective to move material deposited on said sieve in only one direction, said means for reciprocating said sieve including a shaft which is rotatably supported and which is co-axial with said horizontally disposed axis, means for rotating said shaft, and means for mechanically interconnecting said rotating shaft and said linkage to effect the reciprocation of said sieve.

2. In combination in a grain classifying unit, a supporting frame having a pair of mechanically interconnected, generally horizontally disposed, parallel, spaced-apart members, means for supporting said frame for hinged movement about a horizontally disposed axis, at least one classifying sieve, and means for supporting said classifying sieve beneath said supporting frame including two pairs of spaced apart links which interconnect said sieve and said spaced apart members, and means for reciprocating said sieve at a predetermined constant amplitude regardless of the position of said supporting frame relative to said axis, including a shaft which is rotatably supported and which is co-axial with said horizontally disposed axis, an eccentric on each end of said shaft, an arm connecting each of said eccentrics with one pair of said links, and means for rotating said shaft, said arm having a length such that said links are inclined only to the same one side of the vertical throughout said reciprocal movement whereby said movement is effective to shift material deposited on said sieve in only one direction.

3. In combination in a grain classifying unit, a supporting frame having a pair of mechanically interconnected, generally horizontally disposed, parallel, spaced-apart members, means for supporting said frame for hinged movement about a horizontally disposed axis, a plurality of classifying sieves, means for supporting at least one of said classifying sieves beneath said supporting frame including a parallel linkage which swingably interconnects said sieve and said spaced apart members, at least two of the remainder of said sieves being supported in a sub-frame to form a cleaning shoe, and means for supporting said cleaning shoe below said sieve associated with said first parallel linkage in generally parallel relation therewith including a second linkage which swingably interconnects said shoe and said spaced apart members, and means for reciprocating said shoe and said sieve associated with said parallel linkage at predetermined amplitudes regardless of the position of said supporting frame relative to said axis, said reciprocating means including an eccentric drive means which is co-axial with said horizontally disposed axis and means for mechanically interconnecting said sieve and said shoe with said eccentric drive means.

4. In combination in a grain classifying unit, a supporting frame having a pair of mechanically interconnected, generally horizontally disposed, parallel, spaced apart members, means for supporting said frame for hinged movement about a horizontally disposed axis, a plurality of classifying sieves, means for supporting at least one of said classifying sieves beneath said supporting frame including a parallel linkage which swingably interconnects said sieve and said spaced apart members, at least two of the remainder of said sieves being supported in a sub-frame to form a cleaning shoe, and means for supporting said cleaning shoe below and in generally parallel relation with said sieve associated with said parallel linkage including a second linkage which swingably interconnects said shoe and said spaced apart members, and means for reciprocating said shoe and said sieve associated with said parallel linkage at predetermined amplitudes regardless of the position of said supporting frame relative to said axis, said reciprocating means including a shaft which is rotatably supported with its axis coincident with said horizontally disposed axis about which said supporting frame is hingedly supported, a pair of eccentrics attached to said shaft at spaced-apart points, means for operatively connecting said parallel linkage and said second linkage with said eccentrics, and means for rotating said shaft.

5. In combination in a harvester-thresher, a body, a grain classifying unit, said classifying unit being supported for hinged movement within said body, a combined leveling and counterbalancing means which includes a pendulum supported on said body for swinging movement, said pendulum including a pendulum arm and a weight which is slidably supported for movement along said arm, means interconnecting said pendulum weight with said classifying unit for counterbalancing a major portion of the weight of said unit independently of the action of said pendulum arm and means independent of said last mentioned means for interconnecting said pendulum arm with said classifying unit, whereby the movement of the body of said harvester-thresher from the horizontal during operation of the harvester in the field is operable to cause said combined leveling and counterbalancing mechanism to automatically maintain said classifying unit in a substantially horizontal position.

6. In combination in a harvester-thresher, a body, a grain classifying unit, said classifying unit being supported for hinged movement within said body about a horizontally disposed axis, a combined leveling and counterbalancing means which includes a pendulum comprising an arm and a weight, said weight being slidable along said arm, and said arm being swingably supported on said body, a crank pivotally supported on said body, means interconnecting said crank with said classifying unit at a point spaced from the horizontally disposed axis, means connecting said crank with said pendulum arm, and independent means connecting said crank with said pendulum weight, whereby said weight is effective to counterbalance a major portion of the weight of said unit independently of the action of said pendulum arm.

7. In combination in a harvester-thresher, a longitudinally extending body, a grain classifying unit, said classifying unit being hingedly supported for movement within said body about a horizontally disposed, transversely extending axis, and a combined leveling and counterbalancing means which includes at least one pendulum which is supported for swinging movement longitudinally of the harvester body of said harvester-thresher, said pendulum including a pendulum arm and a weight which is slidably supported upon said arm, a crank pivotally supported on said body, said crank being connected to said classifying unit, a link connecting said crank and said pendulum arm, and a flexible member interconnecting said crank and said pendulum weight, whereby said weight is effective to counterbalance a major portion of the weight of said unit independently of the action of said pendulum arm and the movement of said body from the horizontal during the operation of the harvester-thresher is operable to cause said combined leveling and counterbalancing means to automatically maintain said classifying unit in a substantially horizontal position.

8. In combination in a harvester-thresher, a longitudinally extending body, a grain classifying unit, said classifying unit being hingedly supported for movement within said body about a horizontally disposed, transversely extending axis, and a combined leveling and counterbalancing means which includes at least one pendulum, said pendulum including a pendulum arm and a weight which is slidably supported for movement along said pendulum arm, means for swingably supporting said pendulum arm on the body of said harvester-thresher, the axis for said swinging movement being disposed intermediate the ends of said pendulum arm, a crank pivotally supported on said body, said crank being connected to said classifying unit at a point spaced from said horizontally disposed hinged axis, a compression resisting link interconnecting said crank and said pendulum arm at a point spaced above said axis of swinging movement, and a flexible cable interconnecting said crank and said pendulum weight whereby said weight is effective to counterbalance a major portion of the weight of said unit independently of the action of said pendulum arm and the movement of said body from the horizontal during the operation of the harvester-thresher is operable to cause said combined leveling and counterbalancing means to automatically maintain said classifying unit in a substantially horizontal position.

9. In combination in a harvester-thresher, a longitudinally extending body, a grain classifying unit, means for hingedly supporting said classifying unit for movement within said body about a horizontally disposed, transversely extending axis, and a combined leveling and counterbalancing means which includes at least one pendulum, said pendulum including a pendulum arm and a weight which is slidably supported for movement along said pendulum arm, means for swingably supporting said pendulum arm on the body of said harvester-thresher, the axis for said swinging movement being disposed intermediate the ends of said pendulum arm, a guide pulley rotatably supported on said pendulum arm adjacent said axis for swinging movement, a crank pivotally supported on said body, said crank being connected to said classifying unit at a point spaced from said horizontally disposed hinged axis, a compression resisting link interconnecting said crank and said pendulum arm at a point spaced above said axis of swinging movement, and a flexible cable interconnecting said crank and said pendulum weight, said flexible cable being trained around said guide pulley, whereby said weight is effective to counterbalance a major portion of the weight of said unit independently of the action of said pendulum arm and the movement of said body from the horizontal during the operation of the harvester-thresher is operable to cause said combined leveling and counterbalancing means to automatically maintain said classifying unit in a substantially horizontal position.

10. In combination in a harvester-thresher, a longitudinally extending body, a grain classifying unit, means for hingedly supporting said classifying unit for movement within said body about a horizontally disposed, transversely extending axis, and a combined leveling and counterbalancing means which includes at least one pendulum, said pendulum including a pendulum arm and a weight which is slidably supported for movement along said pendulum arm, means for supporting said pendulum arm for swingable movement longitudinally of the body of said harvester-thresher including a horizontally disposed, transversely extending pivot which is disposed intermediate the ends of said pendulum arm, a crank pivotally supported about a transversely extending, horizontally disposed axis on said body, means for mechanically connecting said crank and a point on said classifying unit which is spaced from said horizontally disposed, hinged axis, a compression resisting link interconnecting said crank and said pendulum arm at a point spaced above said horizontally disposed pivot, and a flexible cable interconnecting said crank and said pendulum weight whereby said weight is effective to counterbalance a major portion of the weight of said unit independently of the action of said pendulum arm and the movement of said body from the horizontal during the operation of the combine is operable to cause said combined leveling and counterbalancing means to automatically maintain said classifying unit in a substantially horizontal position.

11. In combination in a harvester-thresher, a longitudinally extending body, a grain classifying unit, means for hingedly supporting said classifying unit for movement within said body about a horizontally disposed, transversely extending axis, and a combined leveling and counterbalancing means which includes at least one pendulum, said pendulum comprising a pendulum arm and a weight which is slidably supported for movement along said arm, means for supporting said pendulum arm for swingable movement longitudinally of the body of said harvester-thresher, including a horizontally disposed, transversely extending pivot which is disposed intermediate the said pendulum arm and which is spaced from the longitudinal axis of said pendulum arm, a guide pulley rotatably supported on said pendulum arm with its periphery disposed adjacent said transversely extending pivot, a crank pivotally supported about a transversely extending, horizontally disposed axis on said body, means for mechanically connecting said crank to a point on said classifying unit which is spaced from said horizontally disposed, hinged axis, a compression resisting link interconnecting said crank and said pendulum arm at a point spaced above said horizontally disposed pivot, and a flexible cable interconnecting said crank and said pendulum weight, said cable extending around said guide pulley, the connection between said flexible cable and said crank being disposed a greater distance from the axis of said crank than the connection between said compression resisting link and said crank, whereby said weight is effective to counterbalance a major portion of the weight of said unit independently of the action of said pendulum arm and the movement of said body from the horizontal during the operation of the harvester-thresher is operable to cause said combined leveling and counterbalancing means to automatically maintain said classifying unit in a substantially horizontal position.

12. In combination in a harvester-thresher, a longitudinally extending body, a grain classifying unit, means for hingedly supporting said classifying unit for hinged movement within said body about a horizontally disposed, transversely extending axis, and a combined leveling and counterbalancing means which includes a pair of pendulums one of which is disposed on each side of the body of said harvester-thresher, each of said pendulums comprising an arm and a weight, said weight being freely slidable along said arm, said arms being attached, intermediate their ends, to a cross shaft which is journalled in said body whereby said pendulums are swingable as a unit, a pair of cranks one of which is pivotally supported on each side of said body about an axis which is parallel to said cross shaft, means for mechanically interconnecting said classifying unit with each of said cranks and means including a compression resistant link connecting each of said cranks with the upper end of said pendulum arm on the corresponding side of said body, and a flexible cable connecting each of said cranks with said pendulum weight on the corresponding side of said body, whereby said weights are effective to counterbalance a major portion of the weight of said unit independently of the action of said pendulum arms.

13. In a harvester-thresher, means defining the side walls and the top and bottom of a longitudinally extending body, a fan disposed in the bottom portion of said body having means defining an outlet for providing a rearwardly and an upwardly directed stream of air, a grain classifying unit disposed within said body which comprises a frame, means for supporting said frame for hinged movement about a horizontally disposed, transversely extending axis which is located closely adjacent the outlet of said fan, a plurality of classifying sieves, means including a first linkage for swingingly interconnecting at least one of said sieves and said frame, means including a second linkage for swingably interconnecting at least one of the remainder of said sieves and said frame, the sieve associated with said second linkage being disposed below and generally parallel to the sieve associated with the first linkage, means for reciprocating said sieves at predetermined amplitudes, each of said sieves being provided with side members of flexible material which slidably contact the inner surfaces of the walls of said body to effectively direct substantially all of the air from said fan through said sieves, means associated with the rearward end of said frame for automatically swinging said classifying unit about said horizontally disposed axis to maintain said unit in the horizontal position during the operation of the harvester-thresher in the field, and sealing means for the rearward end of said classifying unit including a deflector which is hingedly attached to the rearward end of said frame and which bears against the bottom of said body and a flexible member which interconnects the rearward end of said upper sieve with said deflector member.

14. In a harvester-thresher, means defining the side walls and the top and bottom of a longitudinally extending body, a fan disposed in the bottom portion of said body having means defining an outlet for providing a rearwardly and an upwardly directed stream of air, a grain classifying unit disposed within said body comprising a frame, means for supporting said frame for hinged movement about a horizontally disposed, transversely extending axis which is located closely adjacent the outlet of said fan, a plurality of classifying sieves, means including a first linkage for swingably interconnecting one of said sieves and said frame, a sub-frame, a pair of said sieves being supported one above the other in said sub-frame to form a cleaning shoe, means including a second linkage for swingably interconnecting said sub-frame and said frame, said sub-frame being proportioned to engage the bottom of said body and to extend continuously upward to the upper of said sieves supported in said sub-frame, said shoe being disposed below and generally parallel to the sieve associated with the first linkage, means for reciprocating said sieves at predetermined amplitudes, said sieve and the upper portion of said shoe being provided with side members of flexible material which slidably contact the inner surfaces of the walls of said body to effectively direct substantially all of the air from said fan through said sieves, means associated with the rearward end of said classifying-unit frame for automatically swinging said classifying unit about said horizontally disposed axis to maintain said unit in the horizontal position during the operation of the harvester-thresher in the field, and sealing means for the rearward end of said classifying unit including a deflector which is hingedly attached to the rearward end of said frame and which bears against the bottom of said body, and a flexible member which interconnects the rearward end of the sieve associated with said first linkage with said deflector member.

15. In combination in a harvester-thresher, a body, a grain classifying unit, a frame supporting the classifying unit supported for hinged movement about a horizontally disposed axis, a combined leveling and counterbalancing means which includes means comprising a pendulum arm and weight, said weight being slidable upon said arm, said arm being swingably supported upon said body, and means connecting said slidable pendulum weight with said frame whereby vertical movement of the latter about said hinge axis is effective to slidably move said weight upon said arm to thereby counterbalance a major portion of the weight of said classifying unit independently of the action of said pendulum arm.

16. In combination in a harvester-thresher, a body, a grain classifying unit, a frame supporting the classifying unit supported for hinged movement about a horizontally disposed axis, a combined leveling and counterbalancing means comprising a swingably and vertically movable pendulum weight, said weight being operatively connected with said supporting frame for movement vertically in response to movement of said frame about said hinge axis, whereby said pendulum weight is effective to counterbalance a major portion of the weight of said classifying unit independently of the swinging unit of said pendulum weight, said pendulum arm being also connected with said frame for swinging movement of said arm in response to movement of said frame about said hinge axis.

17. In a harvester-thresher, means defining the side walls and the top and bottom of a longitudinally extending body, a fan disposed in the bottom portion of said body having means defining an outlet for providing a rearwardly and an upwardly directed stream of air, a grain classifying unit disposed within said body which comprises a frame including a pair of horizontally extending, parallel, mechanically interconnected members, means for supporting said mechanically interconnected members for hinged movement about a horizontally disposed, transversely extending axis which is located closely adjacent the outlet of said fan, the rearward end of each of said members being provided with a downwardly extending bracket, a plurality of classifying sieves, means including a first linkage for swingably interconnecting one of said sieves and said frame, a sub-frame, a pair of said sieves being supported one above the other in said sub-frame to form a cleaning shoe, means including a second linkage for swingably interconnecting said sub-frame and said frame, said sub-frame being proportioned to parallel the bottom of said body and to extend continuously upward to the upper of said sieves supported in said sub-frame, said shoe being disposed below and generally parallel to the sieve associated with the first linkage, means for reciprocating said sieves at predetermined amplitudes, said sieve and the upper portion of said shoe being provided with side members of flexible material which slidably contact the inner surfaces of the walls of said body to effectively direct substantially all of the air from said fan through said sieves, means associated with the rearward end of said classifying unit frame for automatically swinging said classifying unit about said horizontally disposed axis to maintain said mechanism in the horizontal position during the operation of the harvester-thresher in the field and to counterbalance the weight of said classifying unit and the grain contained therein, and sealing means for the rearward end of said classifying unit including a deflector plate which is hingedly attached to the lower ends of said downwardly extending brackets and which bears against the bottom of said harvester-thresher and a flexible sealing member which interconnects the rearward end of the sieve associated with said first linkage with said deflector member.

18. In combination in a grain classifying unit, a normally horizontal supporting frame, means for supporting said frame for hinged movement about a horizontal axis, a pair of superposed, vertically-spaced, generally-parallel classifying sieves, parallel links for swingably suspending one of said sieves from said frame, other links swingably suspending the other of said sieves from said frame, a connecting link connected at one end to one of said parallel links below the connection of said parallel link to said frame and at its other end to one of said other links above the connection of said other link to said frame whereby said sieves are interconnected to swing in opposite directions, and means for reciprocating said interconnected sieves including an eccentric drive means which is co-axial with said horizontal axis and means interconnecting said drive means with said interconnected suspension links, said parallel links and said other links being inclined only to the same one side of the vertical throughout said reciprocal movement whereby said reciprocal movement is effective to shift material deposited on said sieves in only one direction.

19. In a harvester-thresher, top, bottom and side walls defining a longitudinally extending body, a grain classifying unit disposed within said body, said unit including a generally horizontal frame hingedly mounted for swinging movement about a horizontal axis and a sieve suspended from said frame for reciprocal movement longitudinally of said body, a fan disposed within said body for directing a stream of air upwardly and rearwardly through said sieve, said sieve having sidewardly extending flexible sealing members engaging the side walls of said body to prevent the flow of air around the sides of said sieve, said frame having at its rearward end a hingedly mounted, depending plate engaging the bottom wall of said body and a flexible element connecting the upper edge of said plate and the rearward end of said sieve, the lower edge of said plate being urged by gravity against the bottom wall of said body irrespective of the angular displacement of said frame relative to said horizontal axis, whereby substantially all of the air discharged by said fan passes through said sieve.

20. In combination in a grain classifying unit, a frame, a pair of superposed vertically spaced classifying sieves substantially coextensive with respect to each other, links for supporting one of said sieves on said frame for reciprocation relative to said frame, other links for supporting the other of said sieves on said frame for reciprocation relative to said frame, and means for effecting the reciprocation of said sieves, said means being operable to reciprocate said sieves simultaneously in opposite directions and at different amplitudes, said links being inclined only to the same one side of the vertical throughout said reciprocation whereby said reciprocation is effective to move material deposited on said sieves in only one direction.

References Cited in the file of this patent

UNITED STATES PATENTS

| Number | Name | Date |
|---|---|---|
| 566,494 | Bufkin | Aug. 25, 1896 |
| 894,439 | Hovland | July 28, 1908 |
| 915,688 | Martyn | Mar. 16, 1909 |
| 1,122,803 | Rhodes | Dec. 29, 1914 |
| 1,310,759 | Lucas | July 22, 1919 |
| 1,621,194 | Elder | Mar. 15, 1927 |
| 2,241,842 | Brusset | May 13, 1941 |
| 2,266,805 | Ronning | Dec. 23, 1941 |
| 2,361,601 | Carter | Oct. 31, 1944 |
| 2,395,163 | Carroll | Feb. 19, 1946 |
| 2,588,088 | Cover | Mar. 4, 1952 |

FOREIGN PATENTS

| Number | Country | Date |
|---|---|---|
| 502,817 | Great Britain | Mar. 24, 1939 |